(12) United States Patent
Schwartz et al.

(10) Patent No.: US 12,136,397 B1
(45) Date of Patent: Nov. 5, 2024

(54) BRIGHTNESS MANAGEMENT FOR A VEHICLE ENVIRONMENT

(71) Applicant: Ford Global Technologies, LLC, Dearborn, MI (US)

(72) Inventors: Jake Schwartz, Dearborn, MI (US); Mahmoud Yousef Ghannam, Canton, MI (US); Robert Schroeter, Livonia, MI (US); Arun Dutta, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/489,434

(22) Filed: Oct. 18, 2023

(51) Int. Cl.
 *G09G 3/34* (2006.01)
 *H04M 1/72409* (2021.01)
 *B60K 35/00* (2006.01)
 *B60K 35/65* (2024.01)

(52) U.S. Cl.
 CPC ...... *G09G 3/342* (2013.01); *H04M 1/724098* (2022.02); *B60K 35/00* (2013.01); *B60K 35/65* (2024.01); *B60K 2360/349* (2024.01); *G09G 2320/0626* (2013.01); *G09G 2370/02* (2013.01); *G09G 2370/16* (2013.01)

(58) Field of Classification Search
 CPC ........... G09G 3/342; G09G 2320/0626; G09G 2370/02; G09G 2370/16; H04M 1/724098; B60K 35/00; B60K 35/65; B60K 2360/349
 See application file for complete search history.

(56) References Cited

U.S. PATENT DOCUMENTS

| | | | |
|---|---|---|---|
| 9,176,314 B1* | 11/2015 | Hartwell | G02B 23/12 |
| 9,445,011 B2 | 9/2016 | Zhang et al. | |
| 9,944,183 B2 | 4/2018 | Yagyu et al. | |
| 10,562,379 B2 | 2/2020 | Ghannam et al. | |
| 2012/0062744 A1 | 3/2012 | Schofield et al. | |
| 2012/0253552 A1* | 10/2012 | Skelton | B60K 28/063 |
| | | | 701/1 |
| 2014/0015737 A1* | 1/2014 | Inoue | H04M 1/72463 |
| | | | 345/2.3 |
| 2014/0107891 A1* | 4/2014 | Choi | G06F 7/00 |
| | | | 701/1 |
| 2014/0111637 A1 | 4/2014 | Zhang et al. | |
| 2016/0144714 A1* | 5/2016 | Kim | H04M 1/72412 |
| | | | 701/1 |
| 2020/0221272 A1* | 7/2020 | Sakurada | H04N 7/188 |
| 2021/0039652 A1* | 2/2021 | Ito | B60W 40/08 |

* cited by examiner

*Primary Examiner* — Dmitriy Bolotin
(74) *Attorney, Agent, or Firm* — Frank Lollo; Price Heneveld LLP

(57) ABSTRACT

A brightness management system for a vehicle includes a network providing wireless communication for a vehicle environment, a mobile device in the vehicle environment and including a first light detector for detecting a first light level at a first location of the mobile device, at least one vehicle display coupled with the vehicle and having at least one brightness level, and control circuitry communicatively coupled with the mobile device and the at least one vehicle display via the network. The control circuitry is configured to detect the first location of the mobile device in the vehicle, receive an indication of the first light level from the mobile device, and communicate a signal to adjust the at least one brightness level of the at least one vehicle display based on the first location and the first light level.

20 Claims, 4 Drawing Sheets

US 12,136,397 B1

BRIGHTNESS MANAGEMENT FOR A VEHICLE ENVIRONMENT

FIELD OF THE DISCLOSURE

The present disclosure generally relates to a brightness management for a vehicle environment and, more particularly, to individualized brightness control of vehicle displays based on sensed lighting conditions.

BACKGROUND OF THE DISCLOSURE

The lighting conditions for a vehicle are conventionally detected by a sunlight sensor typically placed near a front of the vehicle.

SUMMARY OF THE DISCLOSURE

According to a first aspect of the present disclosure, a brightness management system for a vehicle includes a network providing wireless communication for a vehicle environment, a mobile device in the vehicle environment and including a first light detector for detecting a first light level at a first location of the mobile device, at least one vehicle display coupled with the vehicle and having at least one brightness level, and control circuitry communicatively coupled with the mobile device and the at least one vehicle display via the network. The control circuitry is configured to detect the first location of the mobile device in the vehicle, receive an indication of the first light level from the mobile device, and communicate a signal to adjust the at least one brightness level of the at least one vehicle display based on the first location and the first light level.

Embodiments of the first aspect of the present disclosure can include any one or a combination of the following features:
- a second light detector that detects a second light level at a second location in the vehicle environment, wherein the control circuitry includes a light mapping module that compares the first light level to the second light level to estimate a lighting gradient of the vehicle environment;
- control circuitry is further configured to receive an indication of a use status of the mobile device, wherein the signal to adjust the at least one brightness level is based further on the use status of the mobile device;
- the light mapping module is configured to adjust the estimation of the lighting gradient in response to the use status;
- at least one vehicle display includes a first vehicle display in a first passenger zone of the vehicle and a second vehicle display in a second passenger zone of the vehicle, wherein the at least one brightness level includes a first brightness level and a second brightness level each adjustable in response to the lighting gradient;
- first vehicle display is coupled to a seating assembly configured to move the first vehicle display between the first passenger zone and another zone, wherein moving the first vehicle display between the first passenger zone and the another zone causes adjustment of the first brightness level;
- adjustment of the first brightness level to the another zone is based on a light intensity difference between the first passenger zone and the another zone;
- a seat position sensor that detects a position of the seating assembly, wherein the control circuitry is in communication with the seat position sensor and the signal to adjust the at least one brightness level is based further on the position;
- an imaging system that monitors the vehicle environment and is configured to detect a glare on a first part of the at least one vehicle display, wherein the signal is based further on the glare on the first part of the at least one vehicle display; and
- at least one brightness level includes a first brightness level for the first part of a single vehicle display and a second brightness level for a second part of the single vehicle display separate from the first part, wherein the signal to adjust the at least one brightness level includes an instruction to adjust the first brightness level and the second brightness level independent from adjustment to the first brightness level.

According to a second aspect of the present disclosure, a brightness management system for a vehicle includes a network providing wireless communication for a vehicle environment, a mobile device in the vehicle environment and including a first light detector for detecting a first light level at a first location of the mobile device, a second light detector that detects a second light level at a second location in the vehicle environment, at least one vehicle display coupled with the vehicle and having at least one brightness level, and control circuitry communicatively coupled with the mobile device, the at least one vehicle display, and the second light detector via the network. The control circuitry is configured to detect the first location of the mobile device in the vehicle, receive an indication of the first light level from the mobile device, compare, via a light mapping module, the first light level to the second light level to estimate a lighting gradient of the vehicle environment, and communicate a signal to adjust the at least one brightness level of the at least one vehicle display based on the lighting gradient.

Embodiments of the second aspect of the present disclosure can include any one or a combination of the following features:
- control circuitry is further configured to receive an indication of a use status of the mobile device, wherein the signal to adjust the at least one brightness level is based further on the use status of the mobile device;
- the light mapping module is configured to adjust the estimation of the lighting gradient in response to the use status;
- at least one vehicle display includes a first vehicle display in a first passenger zone of the vehicle and a second vehicle display in a second passenger zone of the vehicle, wherein the at least one brightness level includes a first brightness level and a second brightness level each adjustable in response to the lighting gradient;
- first vehicle display is coupled to a seating assembly configured to move the first vehicle display between the first passenger zone and another zone, wherein moving the first vehicle display between the first passenger zone and the another zone causes adjustment of the first brightness level;
- adjustment of the first brightness level to the another zone is based on a light intensity difference between the first passenger zone and the another zone; and
- a seat position sensor that detects a position of the seating assembly, wherein the control circuitry is in communication with the seat position sensor and the signal to adjust the at least one brightness level is based further on the position.

According to a third aspect of the present disclosure, a brightness management system for a vehicle includes a network providing wireless communication for a vehicle environment, a mobile device in the vehicle environment and including a first light detector for detecting a first light level at a first location of the mobile device, at least one vehicle display coupled with the vehicle and having at least one brightness level and control circuitry communicatively coupled with the mobile device and the at least one vehicle display via the network. The control circuitry is configured to detect the first location of the mobile device in the vehicle, receive an indication of the first light level from the mobile device, receive an indication of a use status of the mobile device and communicate a signal to adjust the at least one brightness level of the at least one vehicle display based on the first location, the first light level, and the use status of the mobile device.

Embodiments of the third aspect of the present disclosure can include any one or a combination of the following features:
- an imaging system that detects a second light level at a second location in the vehicle environment, wherein the control circuitry includes a light mapping module that compares the first light level to the second light level to estimate a lighting gradient of the vehicle environment; and
- the at least one vehicle display includes a first vehicle display in a first passenger zone of the vehicle and a second vehicle display in a second passenger zone of the vehicle, wherein the at least one brightness level includes a first brightness level and a second brightness level each adjustable in response to the lighting gradient.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
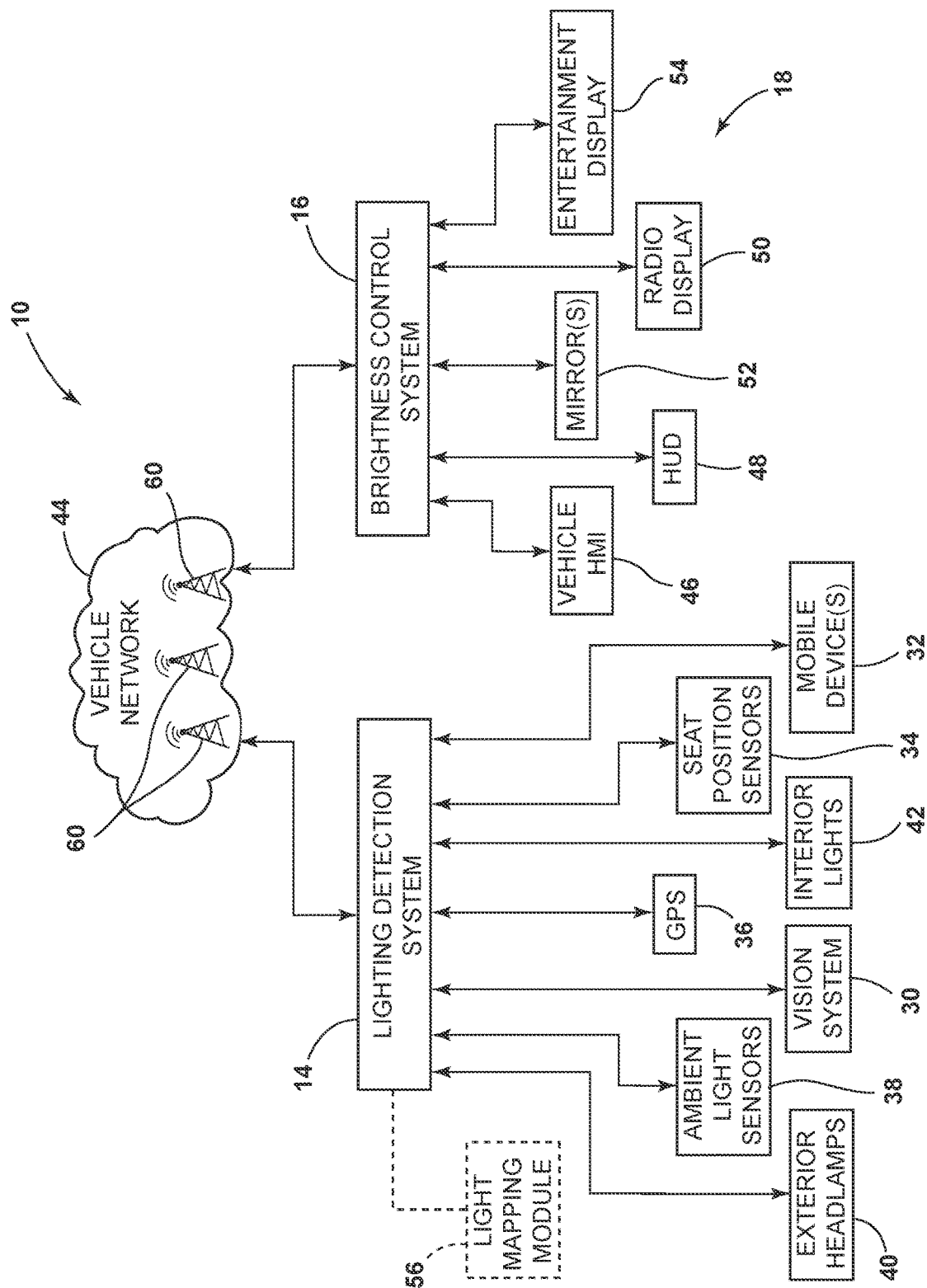
FIG. 1 a functional block diagram of a brightness management system for a vehicle environment according to one aspect of the present disclosure.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a brightness management for a vehicle environment. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring generally to FIGS. 1-4, a system for managing brightness conditions is generally illustrated at 10 applied and a vehicle environment 12. In general, the brightness management system 10 detects lighting conditions in the vehicle environment 12 via a lighting detection system 14 and controls the brightness of one or more vehicle displays 18 via a brightness control system 16 of the brightness management system 10. The brightness management system 10 may provide for enhanced control over multiple vehicle displays 18 by mapping the lighting conditions to one or more zones 20 in an interior 22 of a vehicle 24 and detecting, or predicting, the lighting distribution in the interior 22 to control the brightness of individual displays in individual zones 20. The brightness management system 10 may further provide for individualized brightness control of a single display by detecting glare 26 on the vehicle display 18 and adjusting brightness for that vehicle display 18 in response to detection of the glare 26. As will be described further herein, such adjustment to an individual vehicle display 18 may include brightness control of particular parts of a single display to present a balanced picture within the display.

Referring now more particularly to FIG. 1, the brightness management system 10 may utilize the lighting detection system 14 to detect lighting conditions within the vehicle environment 12 using a plurality of light detectors. For example, the lighting detection system 14 includes a vision system 30, mobile devices 32, seat position sensors 34, a Global Positioning System (GPS 36), and ambient light sensors 38. The lighting detection system 14 may also, or alternatively, access or be in communication with systems for controlling exterior headlamps 40 or interior lighting systems for the vehicle 24. For example, a state of the exterior headlamps 40 and/or the interior lighting system 42 may be detected via communication with control circuitry of the brightness management system 10. As will be described further herein, any combination of these light detectors may be utilized to map the lighting conditions of the vehicle environment 12, such as the interior 22 of the vehicle 24.

A vehicle network 44 is provided to allow wireless and/or wired communication among devices on the vehicle network 44 of the brightness management system 10. For example, the lighting detection system 14 may be in communication with the brightness control system 16 via the vehicle network 44. It is contemplated that the various devices on the lighting detection system 14 and the various devices on the brightness control system 16 may be equipped with individual communication modules to allow direct communication of the devices of the lighting detection system 14 with the devices of the brightness control system 16. For example, the mobile devices 32 of the lighting detection system 14 may be smartphones, tablets, or other mobile devices 32 used by a user 64 in the vehicle 24 that are equipped with wireless communication technology. The wireless and/or wired communication may therefore be connected to some or all of the devices on the brightness management system 10.

Figure 2:
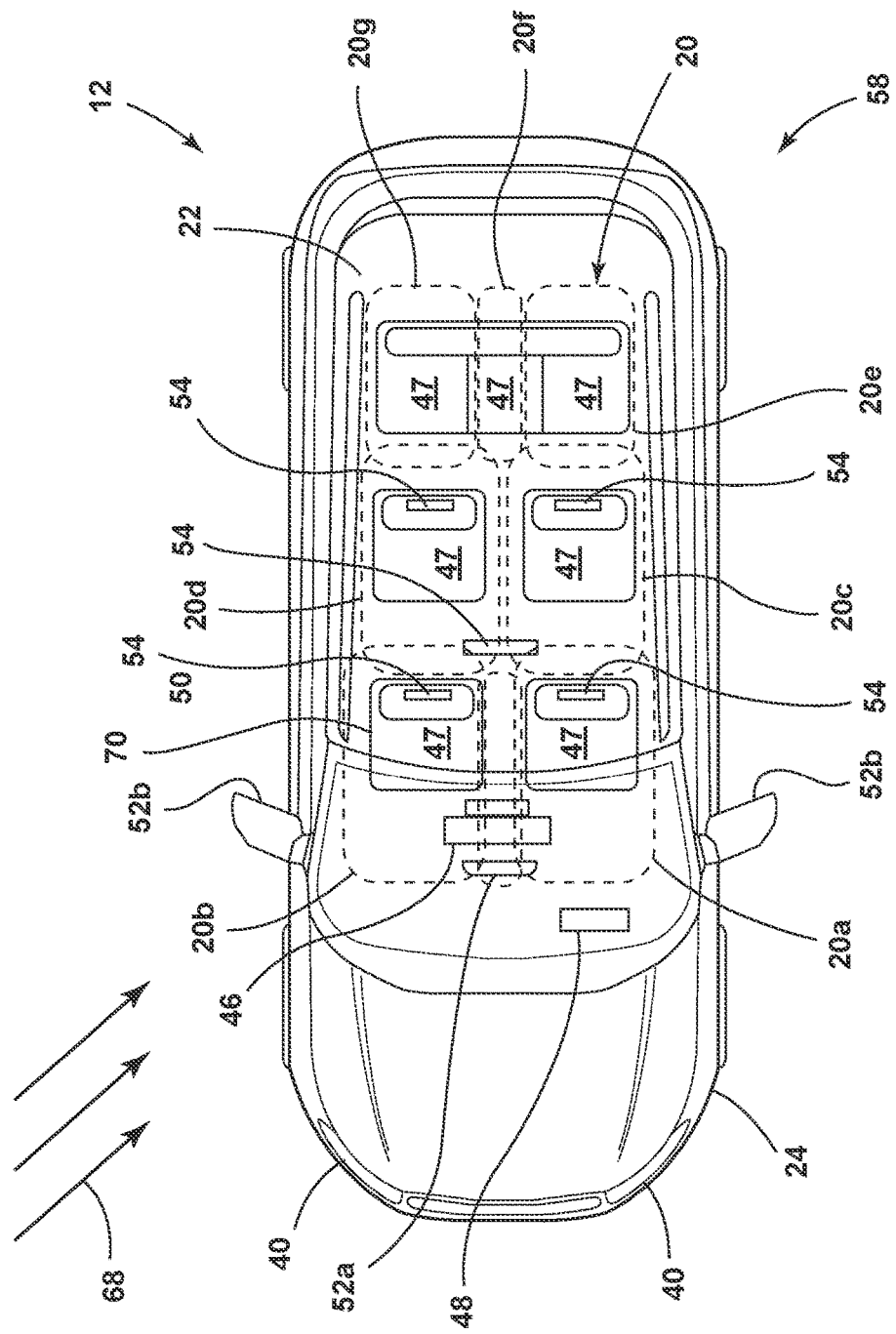
FIG. 2 is a top plan view of a vehicle illustrating interior seating assemblies of the vehicle that incorporate vehicle displays for adjustment by a brightness management system for a vehicle environment.
Figure 3:
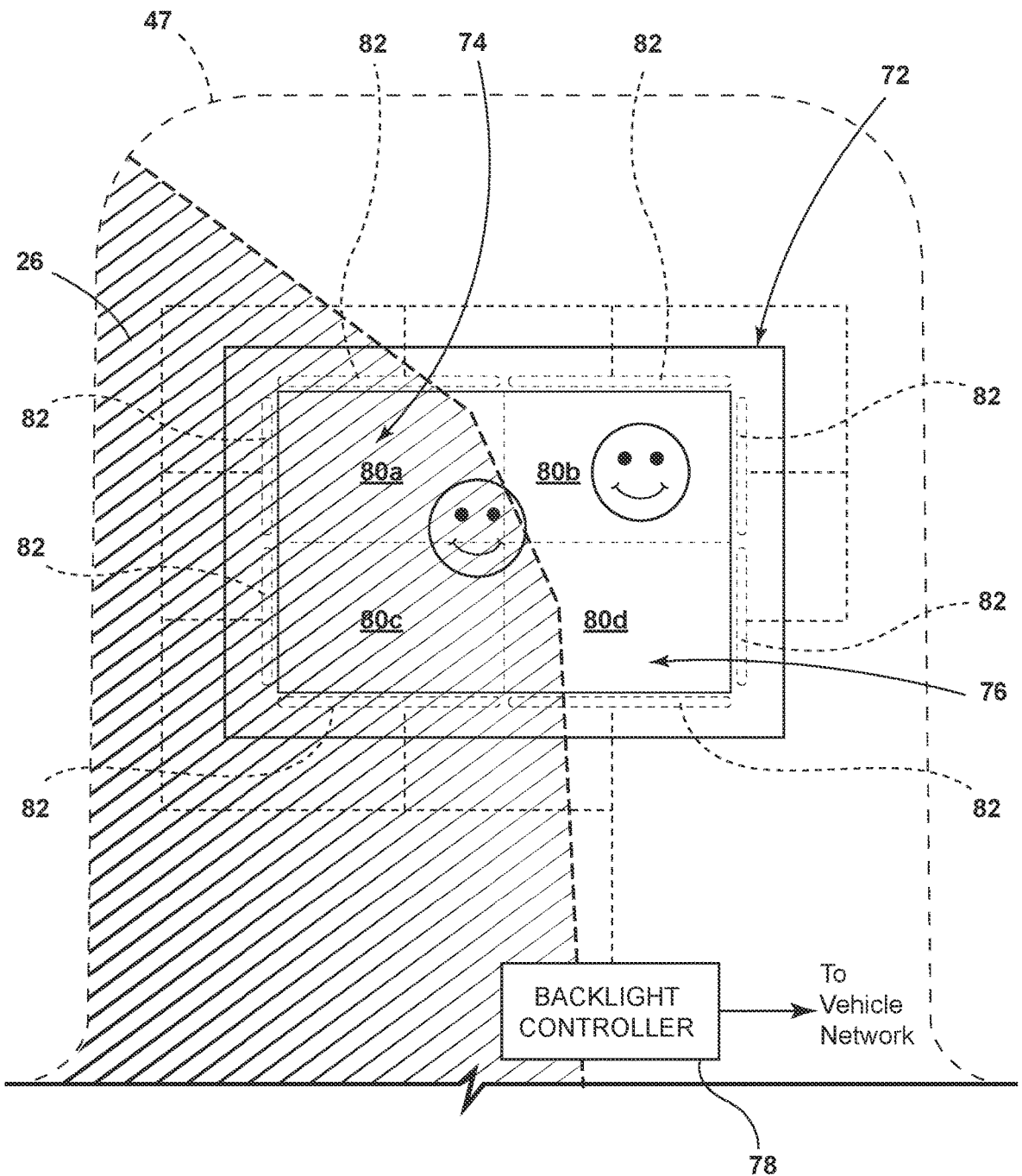
FIG. 3 is a front plan view of an exemplary display having light glare over a portion of the display and demonstrating localized brightness control for the vehicle display.
Figure 4:
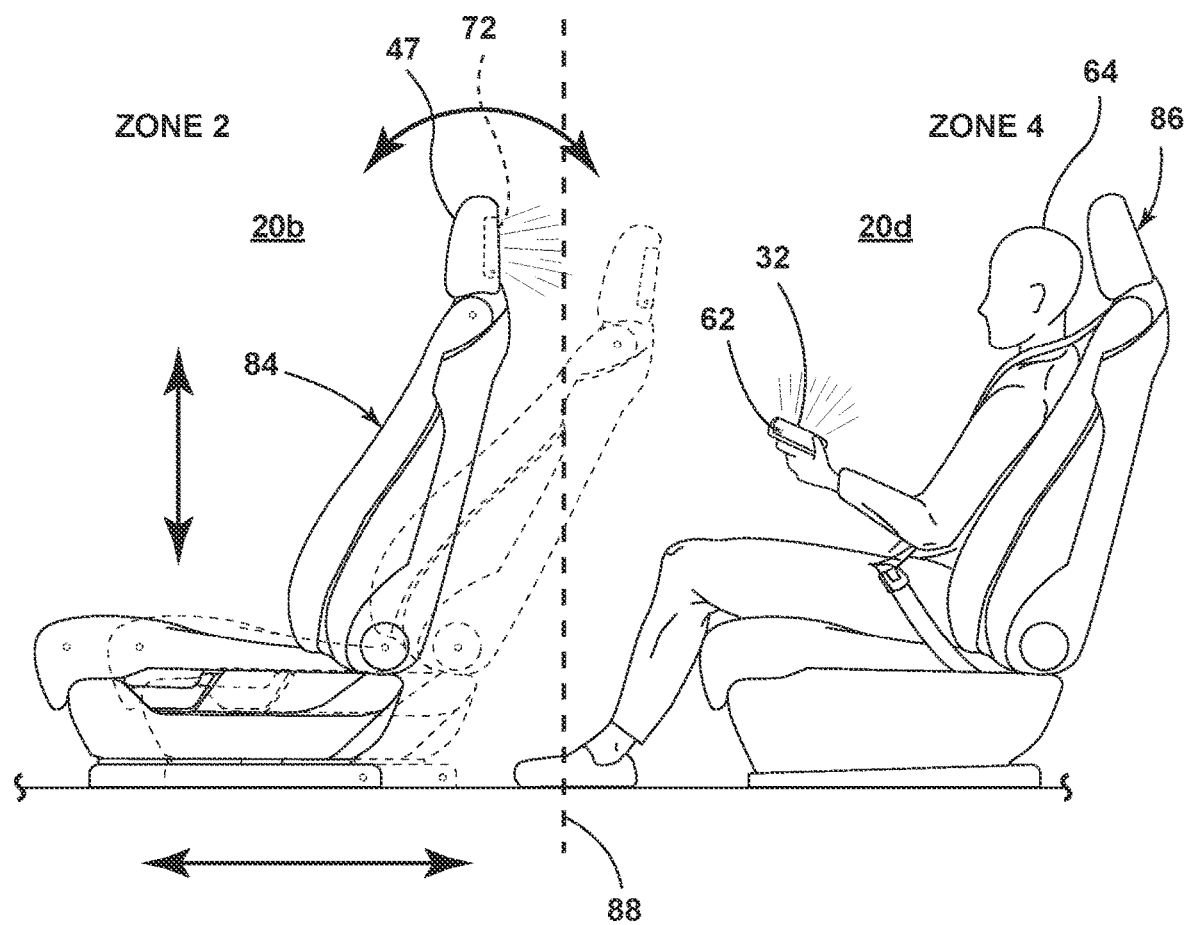
FIG. 4 is a side elevational view of an interior of a vehicle demonstrating movement of a vehicle display between two zones of the vehicle.

It is contemplated that any wired or wireless communication protocol may be employed by the vehicle network 44, such as Bluetooth®, Bluetooth low energy, ZigBee®, Z-wave®, Wi-Fi®, TCP/IP, Ethernet®, USB, or any other wired or wireless communication protocol. For example, the vehicle network 44 may be a local network in which each device has an assigned IP address. In another example, the vehicle network 44 includes multiple communication protocols, such as Bluetooth® for certain devices and Wi-Fi® for other devices equipped with TCP/IP. Still other devices may be hardwired via a control-area-network (CAN) bus and employ serial communication. For example, a vehicle human-machine interface (HMI 46) may be hardwired into a structure of the vehicle 24, such as a seating assembly (FIGS. 2-4). Similarly, a heads up display (HUD 48) and/or a radio display 50 may be hardwired into the vehicle network 44 within a structure of the vehicle 24. The brightness control system 16 may also include one or more mirrors 52 and/or entertainment displays 54 coupled with the vehicle 24 which may be in wired or wireless communication with the vehicle network 44. Thus, the vehicle network 44 may generally refer to any network using electrical communication using radio frequency (RF), serial communication, etc. to provide signals between communication devices in the vehicle environment 12.

In general, the various devices on the lighting detection system 14 are used to sense lighting conditions in different parts of the vehicle environment 12, such as the zones 20 of the interior 22 and/or areas outside of the vehicle 24, and, based on the lighting conditions, the brightness control system 16 is configured to communicate signals to devices on the brightness control system 16 to adjust brightness levels of these devices. Accordingly, the circuitry on the vehicle network 44 may be referred to as control circuitry and include any number of processors configured to execute instructions stored in one or more memories accessible by the processors that cause the control circuitry to assess or detect the lighting conditions within the vehicle environment 12 and generate an output in response to the lighting conditions. As will be described below, the output may be a brightness adjustment for one or more of the displays.

Still referring to FIG. 1, the lighting detection system 14 can include a light mapping module 56 that maps lighting values to the zones 20 of the vehicle 24 based on the locations of the light detectors in the vehicle environment 12. The light mapping module 56 may be a processor or a set of instructions within the processor, such as a routine or subroutine, that, when executed, causes the light detection system to generate a map 58, or distribution, of light values corresponding to lighting within the vehicle environment 12. For example, sunlight or other external light 68 sources (e.g., streetlights, advertisements, etc.) may cause one side of the vehicle 24 to be lighted with high intensity while another side of the vehicle 24 is relatively dark. Accordingly, a map 58 representing the dark and light portions 80a-80d of the vehicle environment 12 can be generated by the light mapping module 56 to allow the brightness control system 16 to control individual displays based on the distribution of light in the vehicle environment 12. The light mapping module 56 may also have a corresponding memory that stores pre-programmed dimensions, configurations, or orientations of objects in the vehicle 24, such as the seating assemblies 47, a center console, a passenger compartment, a storage compartment, or any other part of the vehicle 24. For example, the light mapping module 56 may store information that indicates the body style of the vehicle 24 (e.g., a truck, a 6- or 7-passenger van, etc.). Accordingly, a gradient of lighting values may be generated by the light mapping module 56 corresponding to various zones 20 within the vehicle 24 that are mapped according to the body style or configuration of the interior 22 of the vehicle 24.

Still referring to FIG. 1, one or more antennas 60 may be included in the control circuitry to provide the vehicle network 44 with wireless communication functionality. For example, the antennas 60 may be configured to process RF signals at low or high frequencies to provide wireless communication between anyone of the devices on the lighting detection system 14 and/or the brightness control system 16. As previously described, one or more of the devices may have a wired connection, while others may have a wireless connection. In either example, both types of devices are on the common vehicle network 44. By providing the wireless communication to the mobile devices 32, for example, the brightness management system 10 can track a usage status of one or more of the mobile devices 32 (e.g., active engagement with the phone via interaction with a touch screen of the phone, specific software applications running on the phone, etc.). For example, one or more processors of the control circuitry may poll, or scan, the vehicle network 44 to detect an active usage status or an inactive usage status. The usage status can therefore be used by the brightness management system 10 to selectively control whether or not information gathered by light sensors 62 on the mobile devices 32 (FIG. 4) are factored into calculation of the lighting gradient. By way of example and not limitation, if a user 64 (FIG. 4) is using a mobile device 32 in one region of the vehicle 24, the light level of the mobile device 32 may be used to calculate the lighting conditions of that region, whereas if the mobile device 32 is not in use, the light level of the mobile device 32 may not be used to calculate the lighting condition. Thus, the control circuitry ss may selectively use the light conditions as detected by the mobile devices 32 based on whether the mobile devices 32 are in use. In this way, more accurate representations of the lighting gradient may be estimated.

The usage status may be used in combination or in an alternative with image and/or video data captured by the vision system 30 to refine the usage status detection. For example, interaction with the screen of the phone may indicate the usage status of the mobile device 32, and the lack of interaction with the screen of the phone may indicate no, or limited, usage of the mobile device 32. However, in some examples, passive usage of the mobile device 32 may be detected by comparing the usage status polled on the vehicle network 44 to images and/or video representative of actual use of the phone. By way of example, if a user 64 is watching a video on a mobile device 32, but is not actively interacting with the touch screen, the control circuitry may prioritize detection of the usage status by the vision system 30 over detection of the usage status based on information communicated over the vehicle network 44. For example, one or more cameras of the vision system 30 can capture images or video of the interior 22 and therefore detect passengers and phone usage in the vehicle 24. Thus, in this example, a usage status bit may be set to HIGH, despite the usage status bit over the vehicle network 44 being LOW.

Referring now to FIG. 2, the plurality of zones 20 are mapped by the brightness management system 10 for controlling the brightness of displays in one or more of the plurality of zones 20 in the vehicle 24. The plurality of zones 20 includes a first zone 20a, a second zone 20b, a third zone 20c, a fourth zone 20d, a fifth zone 20e, a sixth zone 20f, and a seventh zone 20g. Each of the plurality of zones 20 corresponds to a seating position for an occupant of the vehicle 24, though it is contemplated that any number of zones 20 may be mapped by the brightness management system 10 and may or may not correspond to seating positions for occupants, as previously described. For example, another zone may be provided between the first and second zones 20a and 20b corresponding to the center console. The mapping of the plurality of zones 20 may be pre-programmed in one or more processors of the control circuitry or may be determined based on manual input at one or more of the displays (e.g., at the HMI 46). In some examples, the seating sensors are provided within the seating assemblies 47 to detect the seating configuration of the vehicle 24 as well as, or in addition to, the seating angle or position. The seating configurations are communicated to the brightness management system 10 to allow the brightness management system 10 to construct the plurality of zones 20 accordingly. It is contemplated that the plurality of zones 20, while demonstrated as two-dimensional overlays, are three-dimensional, having a height, a width, and a length. The zones 20 may the in any three-dimensional shape, such as a cylinder, a rectangular prism, a sphere, or any regular or irregular shape.

With continued reference to FIG. 2, the mirrors 52 can include a rearview mirror 52a, side mirrors 52b, the HUD 48, the HMI 46, and a plurality of the entertainment displays 54. For example, and as will be demonstrated in FIG. 4, one or more of the plurality of entertainment displays 54 may be disposed within a rear of one or more of the seating assemblies 47 for presentation of images/video to occupants behind the given seating assembly. One or more of the plurality of entertainment displays 54 may alternatively, or additionally, be a drop-down display or another mounted vehicle display 18.

Because light may enter the vehicle 24 from the region external to the vehicle 24 from any number of angles with any number of intensities, the brightness management system 10 is configured to adjust the brightness of the vehicle displays 18 individually, on a vehicle display 18-to-vehicle display 18-basis. The light level for each zone may therefore be used to construct the lighting gradient and therefore determine brightness conditions for each vehicle display 18. For example, the vision system 30 can include one or more cameras (e.g., an imaging system) directed toward the interior 22 of the vehicle 24 and may capture image and/or video data demonstrating light glare 26, shadows, or other lighting conditions on the passengers and/or on the vehicle displays 18. In addition, or in an alternative, the lighting conditions detected by the mobile devices 32 may be communicated over the vehicle network 44 within or to the lighting detection system 14 to allow the lighting detection system 14 to estimate the lighting gradient of the interior 22.

It is contemplated that the GPS 36 allows the lighting detection system 14 to estimate or compensate for the position of external lighting sources, such as the sun or the lack thereof. For example, urban/rural driving may be determined by the lighting detection system 14 based on GPS 36 coordinates in combination with time information indicating night or day and, therefore, may allow the brightness management system 10 to provide more accurate estimations of the lighting conditions in the vehicle 24.

In one example applied to FIG. 2, external light 68 projects toward the vehicle 24 from a vehicle-front-right direction at a low angle of incidence relative to the ground. Based on the light intensity, the angle of entry, and/or the direction of light entry, the light intensity measured by any one of the devices on the lighting detection system 14 may vary throughout the interior 22. For example, the first and second may have relatively high lux values, or lighting estimates values representative of luminosity, compared to the remaining third, fourth, fifth, sixth, and seventh zones 20c, 20d, 20e, 20f, 20g. Further, the third zone 20c may have lower lux values than the fourth zone 20d. Accordingly, shadows may be formed in, for example, the third zone and fifth and sixth zones 20c, 20e, 20f due to light being absorbed/blocked by objects (e.g., seating assemblies 47) between the fifth and 6th zones 20e and 20f and the external light 68.

Still referring to FIG. 2, it is contemplated that one or more of the seating assemblies 47 may be adjustable between adjacent zones 20. By way of example, a front passenger seat 70 may be adjustable between the second zone and the fourth zone 20b and 20d by moving forward or backward. More particularly, an exemplary vehicle display 72 disposed in the front passenger seat 70 may be adjustable between the second zone and the fourth zone 20b and 20d. Such an example is demonstrated in FIG. 4 in reference to a pair of seating assemblies 47. The seat position sensors 34 of the light detection system may be used to detect the position of the front passenger seat 70 and, therefore, the position of the exemplary vehicle display 72 within the front passenger seat 70 to compensate for lighting conditions associated with different zones 20. For example, the front passenger seat 70 in FIG. 2 may move backward to move the exemplary vehicle display 72 from the second zone 20b to the fourth zone 20d. Because the lighting gradient may result in changes in lighting conditions between the second zone and the fourth zone 20b and 20d, the brightness management system 10 may control the exemplary vehicle display 72 on the front passenger seat 70 to be brighter or darker depending on which of the second and fourth zones 20b and 20d the front passenger seat 70 vehicle display 18 is located.

In reference now to FIG. 3, an exemplary light glare 26 detected by the vision system 30 overlays the exemplary vehicle display 72. In this example, the lighting conditions cause a light part 74 and a dark part 76 of the vehicle display 18. In the example demonstrated, the exemplary vehicle display 72 has a backlight controller 78 that controls brightness conditions of the exemplary vehicle display 72. While the backlight controller 78 may control one backlight for the entire exemplary vehicle display 72 in some examples, in this example, the backlight controller 78 can control localized portions 80a-80d of the backlight controller 78 to illuminate some portions 80a-80d of the display with greater intensity than other portions 80a-80d of the display. In the example demonstrated, eight backlight modules 82 are provided along a perimeter of the exemplary vehicle display 72 for controlling localized brightness conditions. The backlight controller 78 may include any number of processors and memory that store instructions. Upon execution of the instructions by the processors of the backlight controller 78, the backlight controller 78 communicates signals to the backlight modules 82 to selectively illuminate the portions 80a-80d of the vehicle display 18.

The backlight controller 78 is included in the brightness control system 16 and communicates the signals to selectively illuminate the different portions 80a-80d of the exemplary vehicle display 72 in response to instructions received by the brightness control system 16. For example, the vision system 30 can detect the glare 26 from images or video of the exemplary vehicle display 72 demonstrated in FIG. 2. In response to the glare 26 detected, the lighting detection system 14 communicates indication of the lighting conditions to the brightness control system 16, which communicates an instruction to the backlight controller 78 of the exemplary vehicle display 72 corresponding to the location of the glare 26 to adjust control of the brightness of one or more of the portions 80a-80d of the exemplary vehicle display 72. In the present example, the glare 26 overlays approximately half (e.g., a left half) of the exemplary vehicle display 72. Accordingly, the backlight controller 78 may communicate signals to the backlight modules 82 to illuminate first and third portions 80a, 80c of the exemplary vehicle display 72 with greater intensity than second and fourth portions 80b, 80d of the exemplary vehicle display 72. It is contemplated that any number of portions 80a-80d of the exemplary vehicle display 72 may be controlled by the backlight controller 78. For example, individual light-emitting diodes (LEDs), OLED's, LCD displays, or any other type of display may be controlled by the backlight controller 78 based on the level of individual brightness control allowed by the exemplary vehicle display 72. In this way, individualized brightness control over a vehicle display 18 may be provided based on the lighting conditions detected by the lighting detection system 14.

It is contemplated that, although the glare 26 demonstrated in FIG. 3 is based on images from the vision system 30, the lighting conditions detected by the mobile device 32 may alternatively, or additionally, be used to provide for individualized control of a brightness. For example, high intensity lux values detected by a mobile device 32 in the same or an adjacent zone 20 as a given vehicle display 18 may result in an increase or decrease in localized brightness levels of the regions of the vehicle display 18.

Referring now to FIG. 4, an example of a mobile display moving between adjacent zones 20 is demonstrated by reclining of a first seating assembly relative to a second seating assembly 86. In the example demonstrated, the brightness management system 10 is configured to control the brightness control system 16 to change the brightness conditions of the exemplary vehicle display 72. A dividing line 88 demonstrating a division between the second zone and the fourth zone 20b and 20d reveals that the vehicle display 18 and moves from the second zone to the fourth zone 20b and 20d upon sliding and or reclining the second seating assembly 86. The moving of the first seating assembly may be detected by the seating sensors in the seating assembly and allow the lighting detection system 14 to estimate the lighting conditions for the exemplary vehicle display 72 to be different than when the second seating assembly 86 is not reclined or slid back to put the vehicle display 18 in the fourth zone 20d. In the present example, light detected by the mobile device 32 may be used to map a lux value of the fourth zone 20d to a different lux value than the second zone 20b. For example, the light entering the vehicle 24 may illuminate the fourth zone 20d with greater intensity than the second zone 20b. Additionally, or alternatively, the manually adjustable brightness levels of the mobile device 32 may be monitored and detected on the vehicle network 44 to indicate that the fourth zone 20d has weak or strong lighting conditions. For example, the user 64 may manually adjust the screen brightness of the mobile display to be high in response to increased lighting conditions or low in response to decreased lighting conditions. Accordingly, these manual adjustments may be detected by the lighting detection system 14 and used in generating the lighting gradient. In some examples, the lighting gradient is already generated, and the manual adjustment adjusts the lighting gradient in response to manual interaction with the brightness control of the mobile device 32. Thus, the use status and manual adjustment status of the brightness conditions of the mobile device 32 may be monitored by the vehicle network 44. Alternatively, or additionally, the vision system 30 may detect the brightness settings of the mobile device 32. In this way, the lighting detection system 14 can modify or enhance estimations of the lighting gradient in response to brightness conditions of the mobile device 32 in addition to lighting conditions detected by the mobile device 32.

Still referring to FIG. 4, and by way of example, a user 64 in the second zone 20b may adjust the first seating assembly rearwardly to move the exemplary vehicle display 72 from the second zone to the fourth zone 20b and 20d. In response, the brightness control system 16 may adjust the brightness conditions of the exemplary vehicle display 72 in response to the movement of the exemplary vehicle display 72 from the second zone to the fourth zone 20b and 20d. The brightness conditions may be adjusted based on the images and or video of the lighting conditions of the fourth zone 20d, ambient lighting conditions of the fourth zone 20d, readings from the light sensor 62 of the mobile device 32, and/or the brightness conditions of the screen/backlight of the mobile device 32.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A brightness management system for a vehicle, comprising:
   a network providing wireless communication for a vehicle environment;
   a mobile device in the vehicle environment and including a first light detector for detecting a first light level at a first location of the mobile device;
   at least one vehicle display coupled with the vehicle and having at least one brightness level; and
   control circuitry communicatively coupled with the mobile device and the at least one vehicle display via the network, wherein the control circuitry is configured to:
   detect the first location of the mobile device in the vehicle;
   receive an indication of the first light level from the mobile device; and
   communicate a signal to adjust the at least one brightness level of the at least one vehicle display based on the first location and the first light level.

2. The brightness management system of claim 1, further comprising:
   a second light detector that detects a second light level at a second location in the vehicle environment, wherein the control circuitry includes a light mapping module that compares the first light level to the second light level to estimate a lighting gradient of the vehicle environment.

3. The brightness management system of claim 2, wherein control circuitry is further configured to receive an indication of a use status of the mobile device, wherein the signal to adjust the at least one brightness level is based further on the use status of the mobile device.

4. The brightness management system of claim 3, wherein the light mapping module is configured to adjust the estimation of the lighting gradient in response to the use status.

5. The brightness management system of claim 2, wherein the at least one vehicle display includes a first vehicle display in a first passenger zone of the vehicle and a second vehicle display in a second passenger zone of the vehicle, wherein the at least one brightness level includes a first brightness level and a second brightness level each adjustable in response to the lighting gradient.

6. The brightness management system of claim 5, wherein first vehicle display is coupled to a seating assembly configured to move the first vehicle display between the first passenger zone and another zone, wherein moving the first vehicle display between the first passenger zone and the another zone causes adjustment of the first brightness level.

7. The brightness management system of claim 6, wherein adjustment of the first brightness level to the another zone is based on a light intensity difference between the first passenger zone and the another zone.

8. The brightness management system of claim 6, further comprising:
   a seat position sensor that detects a position of the seating assembly, wherein the control circuitry is in communication with the seat position sensor and the signal to adjust the at least one brightness level is based further on the position.

9. The brightness management system of claim 1, further comprising:
   an imaging system that monitors the vehicle environment and is configured to detect a glare on a first part of the at least one vehicle display, wherein the signal is based further on the glare on the first part of the at least one vehicle display.

10. The brightness management system of claim 9, wherein the at least one brightness level includes a first brightness level for the first part of a single vehicle display and a second brightness level for a second part of the single vehicle display separate from the first part, wherein the signal to adjust the at least one brightness level includes an instruction to adjust the first brightness level and the second brightness level independent from adjustment to the first brightness level.

11. A brightness management system for a vehicle, comprising:
   a network providing wireless communication for a vehicle environment;
   a mobile device in the vehicle environment and including a first light detector for detecting a first light level at a first location of the mobile device;
   a second light detector that detects a second light level at a second location in the vehicle environment;
   at least one vehicle display coupled with the vehicle and having at least one brightness level; and
   control circuitry communicatively coupled with the mobile device, the at least one vehicle display, and the second light detector via the network, wherein the control circuitry is configured to:

detect the first location of the mobile device in the vehicle;

receive an indication of the first light level from the mobile device;

compare, via a light mapping module, the first light level to the second light level to estimate a lighting gradient of the vehicle environment; and communicate a signal to adjust the at least one brightness level of the at least one vehicle display based on the lighting gradient.

12. The brightness management system of claim 11, wherein control circuitry is further configured to receive an indication of a use status of the mobile device, wherein the signal to adjust the at least one brightness level is based further on the use status of the mobile device.

13. The brightness management system of claim 12, wherein the light mapping module is configured to adjust the estimation of the lighting gradient in response to the use status.

14. The brightness management system of claim 11, wherein the at least one vehicle display includes a first vehicle display in a first passenger zone of the vehicle and a second vehicle display in a second passenger zone of the vehicle, wherein the at least one brightness level includes a first brightness level and a second brightness level each adjustable in response to the lighting gradient.

15. The brightness management system of claim 14, wherein first vehicle display is coupled to a seating assembly configured to move the first vehicle display between the first passenger zone and another zone, wherein moving the first vehicle display between the first passenger zone and the another zone causes adjustment of the first brightness level.

16. The brightness management system of claim 15, wherein adjustment of the first brightness level to the another zone is based on a light intensity difference between the first passenger zone and the another zone.

17. The brightness management system of claim 15, further comprising:

a seat position sensor that detects a position of the seating assembly, wherein the control circuitry is in communication with the seat position sensor and the signal to adjust the at least one brightness level is based further on the position.

18. A brightness management system for a vehicle, comprising:

a network providing wireless communication for a vehicle environment;

a mobile device in the vehicle environment and including a first light detector for detecting a first light level at a first location of the mobile device;

at least one vehicle display coupled with the vehicle and having at least one brightness level; and control circuitry communicatively coupled with the mobile device and the at least one vehicle display via the network, wherein the control circuitry is configured to:

detect the first location of the mobile device in the vehicle;

receive an indication of the first light level from the mobile device;

receive an indication of a use status of the mobile device; and communicate a signal to adjust the at least one brightness level of the at least one vehicle display based on the first location, the first light level, and the use status of the mobile device.

19. The brightness management system of claim 18, further comprising:

an imaging system that detects a second light level at a second location in the vehicle environment, wherein the control circuitry includes a light mapping module that compares the first light level to the second light level to estimate a lighting gradient of the vehicle environment.

20. The brightness management system of claim 19, wherein the at least one vehicle display includes a first vehicle display in a first passenger zone of the vehicle and a second vehicle display in a second passenger zone of the vehicle, wherein the at least one brightness level includes a first brightness level and a second brightness level each adjustable in response to the lighting gradient.

* * * * *